US012614777B2

(12) United States Patent
Frank et al.

(10) Patent No.: US 12,614,777 B2
(45) Date of Patent: Apr. 28, 2026

(54) DEVICE THERMAL MANAGEMENT

(71) Applicant: Comcast Cable Communications, LLC, Philadelphia, PA (US)

(72) Inventors: Joseph Frank, Medford, NJ (US); Vijayanand Dubey, Downingtown, PA (US); Gary Michael Rekstad, Jr., Langhorne, PA (US); Uday Krishna Garpathi, Downingtown, PA (US); Benny Pruden, Brownstown, PA (US); Joseph Thomas Rodolico, Horsham, PA (US); Christopher Stone, Newtown, PA (US); David Urban, Cinnaminson, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 670 days.

(21) Appl. No.: 18/179,133

(22) Filed: Mar. 6, 2023

(65) Prior Publication Data

US 2024/0304888 A1     Sep. 12, 2024

(51) Int. Cl.
| | |
|---|---|
| *H01M 10/633* | (2014.01) |
| *G06V 20/52* | (2022.01) |
| *H01M 10/48* | (2006.01) |
| *H01M 10/615* | (2014.01) |
| *H01M 10/623* | (2014.01) |
| *H01M 10/657* | (2014.01) |
| *H04N 7/18* | (2006.01) |
| *H04N 23/52* | (2023.01) |
| *H04N 23/611* | (2023.01) |
| *H04N 23/65* | (2023.01) |
| *H05B 1/02* | (2006.01) |
| *G06V 40/16* | (2022.01) |

(52) U.S. Cl.
CPC .......... *H01M 10/633* (2015.04); *G06V 20/52* (2022.01); *H01M 10/486* (2013.01); *H01M 10/615* (2015.04); *H01M 10/623* (2015.04); *H01M 10/657* (2015.04); *H04N 7/183* (2013.01); *H04N 23/52* (2023.01); *H04N 23/611* (2023.01); *H04N 23/65* (2023.01); *H05B 1/02* (2013.01); *G06V 40/172* (2022.01); *H01M 2220/30* (2013.01)

(58) Field of Classification Search
CPC ............ H01M 10/633; H01M 10/615; H01M 10/623; H01M 10/657; H01M 10/486; H01M 2220/30; H04N 23/52; H04N 23/65; H04N 23/611; H04N 7/183; H05B 1/02; G06V 20/52; G06V 40/172
USPC ........................................................ 429/62
See application file for complete search history.

(56) References Cited

U.S. PATENT DOCUMENTS

| | | | |
|---|---|---|---|
| 10,796,558 | B2 | 10/2020 | Connor et al. |
| 10,869,006 | B2 | 12/2020 | Alamgir et al. |

(Continued)

FOREIGN PATENT DOCUMENTS

| | | |
|---|---|---|
| WO | 2022055790 A1 | 3/2022 |

*Primary Examiner* — James M Erwin
(74) *Attorney, Agent, or Firm* — Banner & Witcoff, Ltd.

(57) ABSTRACT

Systems, apparatuses, and methods are described for managing temperature of a rechargeable battery between multiple available states of heating. Different thresholds may be used for turning on, and turning off, one or more heating elements associated with the rechargeable battery, and/or for otherwise changing states of the one or more heating elements.

20 Claims, 7 Drawing Sheets

(56) References Cited

U.S. PATENT DOCUMENTS

| | | | | |
|---|---|---|---|---|
| 2017/0294694 A1* | 10/2017 | Tso | .................... | H01M 10/653 |
| 2019/0115632 A1* | 4/2019 | Beuning | ............. | H02M 3/1582 |
| 2023/0335824 A1* | 10/2023 | Wang | ................. | H01M 50/519 |

* cited by examiner

126

Heater State Transitions
(2-State Example)

DEVICE THERMAL MANAGEMENT

BACKGROUND

Many battery-powered devices, such as doorbells and security cameras, are placed in outdoor environments and are exposed to temperature changes. Temperature extremes can degrade the performance of the batteries in these devices, and this degradation may hinder the device's ability to perform its function.

SUMMARY

The following summary presents a simplified summary of certain features. The summary is not an extensive overview and is not intended to identify key or critical elements.

Systems, apparatuses, and methods are described for managing temperature of a battery in a battery-operated device, such as a video doorbell. A heater may be provided, and may offer multiple states (e.g., levels) of heating to help ensure that the battery is warm enough to provide the video doorbell with the energy it needs to handle its functions (e.g., capturing video of a visitor, signaling a chime, etc.). Different thresholds may be established to indicate conditions for the different heating states, and hysteresis thresholds may be used to reduce jitter and improve stability.

The heater may draw power from the same that powers the device (e.g., a battery, or other source), and the heater state may be temporarily reduced if the device is likely to need increased power. For example, if a doorbell camera recognizes an object or sound, the battery heating state may be temporarily reduced to help ensure that the camera has sufficient power to conduct further processing on the object or sound.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
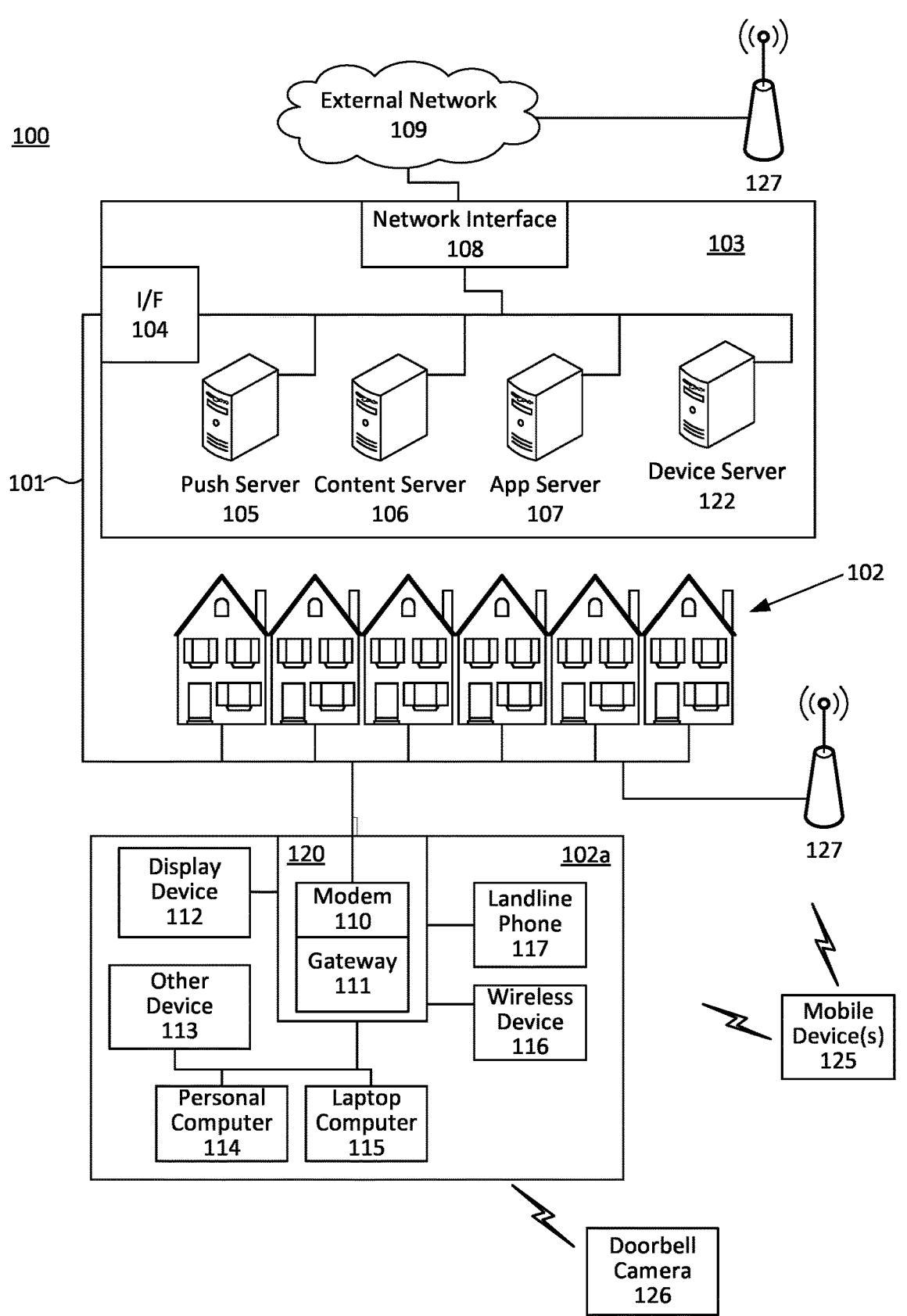
FIG. 1 shows an example communication network on which the features described herein may be implemented.

The accompanying drawings show examples of various features of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as a device server 122 (described below), additional push, content, and/or application servers, and/or other types of servers. Although shown separately, the push server 105, the content server 106, the application server 107, the device server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102*a* may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102*a* to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102*a*. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the mobile devices 125, which may be on- or off-premises. A doorbell camera 126, or other security device, may be installed for monitoring the premises 102*a*, and may communicate with device server 122 to, for example, provide uploads of security events captured by the doorbell camera 126. The doorbell camera 126 may be a wireless device 116.

The mobile devices 125, one or more of the devices in the premises 102*a*, and/or other devices may receive, store, output, and/or otherwise use assets. An asset may comprise a video, a game, one or more images, software, audio, text, webpage(s), and/or other content.

Figure 2:
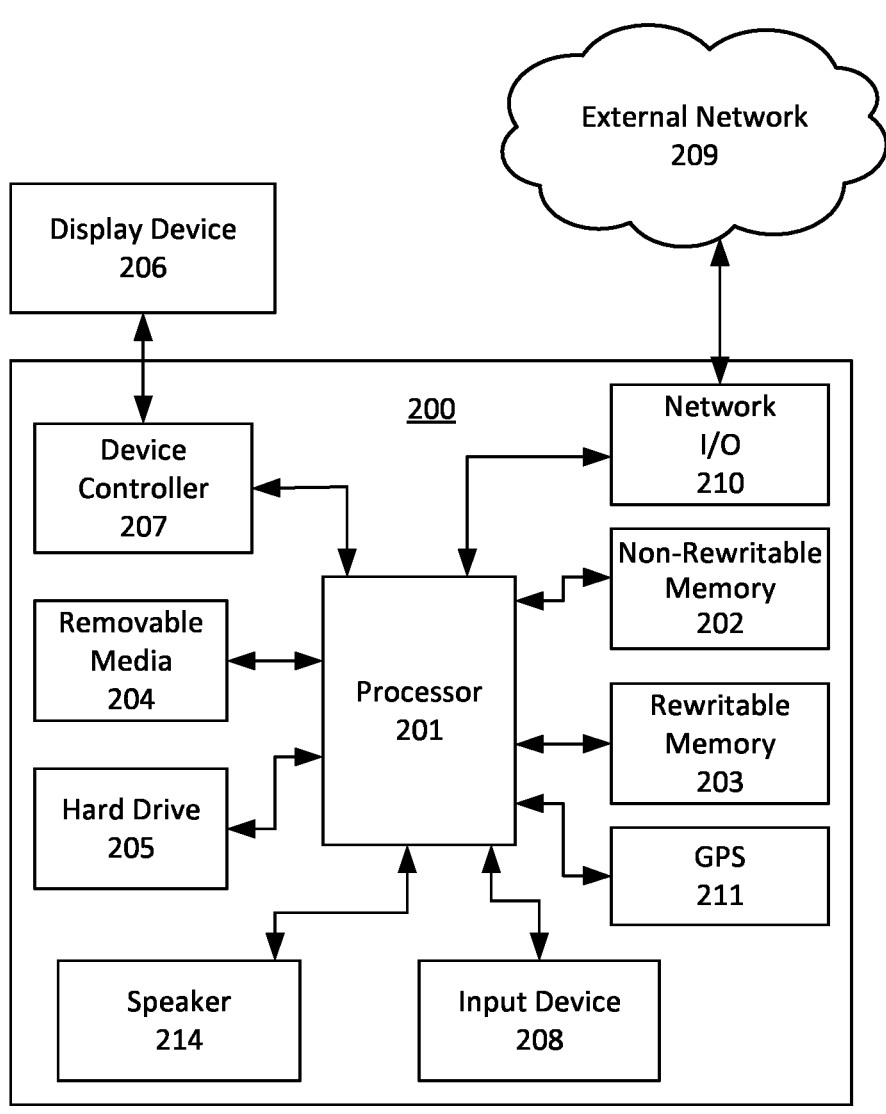
FIG. 2 shows hardware elements of a computing device that may be used to implement any of the devices described herein.

FIG. 2 shows hardware elements of a computing device 200 that may be used to implement any of the computing devices shown in FIG. 1 (e.g., the mobile devices 125, any of the devices shown in the premises 102*a*, any of the devices shown in the local office 103, any of the wireless access points 127, any devices with the external network 109) and any other computing devices discussed herein (e.g., doorbell camera 126). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
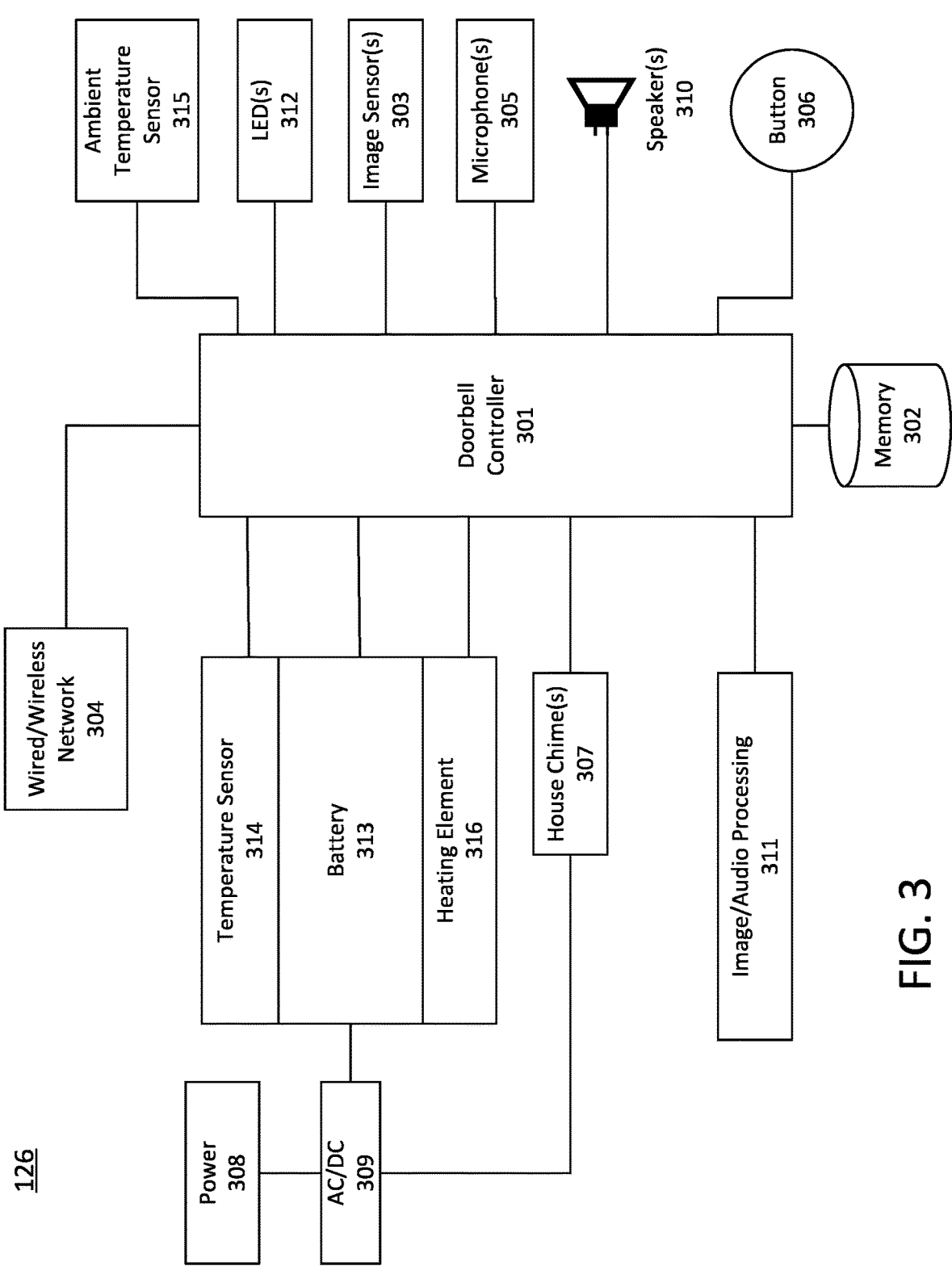
FIG. 3 shows an example of a doorbell having a thermal management system.

FIG. 3 shows a more detailed example of the doorbell camera 126. The doorbell camera 126 may comprise a doorbell controller 301, which may be one or more processors that control the operation of the doorbell camera 126 and the various features described herein, and which may execute instructions stored in memory 302 to control that operation and cause those features to be performed. The doorbell controller 301 and memory 302 may comprise the same features shown in FIG. 2, such as the processor 201, device controller 207, memories 202/203, etc.

The doorbell camera 126 may comprise one or more image sensors 303. The image sensor 303 may comprise one or more image sensing devices that comprise, for example, array of photosensitive elements (e.g., an array of charged-coupled device (CCD) and/or complimentary metal oxide semiconductor (CMOS) elements), memory, and one or more processors and that may be configured to capture images using visible and/or invisible (e.g., infrared) light may comprise cameras that capture visible and/or invisible light (e.g., infrared). The doorbell controller 301 may send captured still and/or moving images to a remote destination, such as device server 122, via a data connection such as a wired or wireless network connection 304 (e.g., wired connection 101, wireless connection via access points 127, etc.), which may in turn send the captured images to a homeowner's phone, to a security monitoring system, or any other desired destination. The image sensor 303 may also, or alternatively, comprise an ambient light sensor to detect an amount of light in the environment. The ambient light may be used, for example, to distinguish between day and night modes for image capture (e.g., night mode may use infrared image capture, while daytime modes may use visible light image capture).

One or more audio sensors 305 (e.g., microphones) may be included as well, to capture sounds, and audio may be included with the video described herein.

The doorbell camera 126 may comprise a button 306 that a visitor is to press when wishing to announce their presence at the premises 102a. Pressing the button 306 may cause one or more house chimes 307 to make a sound such as a ringing bell. The house chimes 307 may be traditional doorbell chimes in a house, and may be powered by the house's power network, such as incoming AC power 308. A chime interface may comprise a relay for diverting power between the chime 307 and other elements, and the power may be converted by an AC-to-DC converter 309 if needed). The doorbell camera 126 may comprise one or more speakers 310, which may be made to play a sound based on the button 306 being pressed.

Pressing the button 306 may also cause the doorbell controller 301 to record still and/or moving video of the visitor (e.g., from image sensor 303), and the doorbell camera 126 may serve as a video intercommunication system to allow a visitor to speak with a homeowner via the network 304, and to allow the homeowner to see images of the visitor via any network device, such as a mobile device 125 connected via local or wide area network.

The doorbell camera 126 may comprise image and/or audio processing hardware and/or software 311, to allow the doorbell camera 126 to process images and/or audio for various purposes. The images may be processed to perform facial recognition of visitors, recognition of text such as license plate numbers of vehicles that arrive at the premises 102a, motion detection, and/or any other desired form of video processing. Similarly, audio processing may be used to recognize voices of visitors, detect audio disturbances such as sirens and alarms, and/or any other desired form of audio processing. The image/audio processing 311 may be implemented locally at the smart doorbell 126, at the gateway 111, remotely at the device server 122, or at any desired location.

The doorbell camera 126 may comprise one or more lighting elements 312, such as light-emitting diodes, to provide illumination of the surrounding area. The lighting elements 312 may help to improve the video quality of images captured by the image sensors 303. The lighting elements 312 may provide visible light and/or infrared light, to complement the image-capturing abilities of the image sensors 303.

The doorbell camera 126 may comprise one or more batteries 313 to provide electrical power. The battery 313 may be rechargeable, and may receive power from the AC-to-DC converter 309. Some rechargeable battery chemistries exhibit degraded performance if the battery is subjected to temperatures that are outside of a desired range. For example, the optimal operating temperature for a lithium-ion battery may be between 15° and 35° Celsius. Such a battery cannot be recharged if the temperature drops below 0° C., and may cease to operate altogether if the temperature reaches −20° C. The doorbell camera 126 may comprise thermal management capabilities to help control the temperature range of the battery 313.

The doorbell camera 126 may comprise one or more temperature sensors 314 to detect the temperature of the battery 313, and/or ambient temperature sensors 315 to detect ambient temperature in the vicinity of the doorbell camera 126. The doorbell camera 126 may also comprise one or more heating elements 316 to provide heat based on the ideal operating range of the battery 313. The heating element 316 may have multiple states of operation (e.g., providing different amounts of heat), each drawing different amounts of power from the battery 313. As will be discussed below, the operation of the heating element 316 may be controlled to help prolong the operating life of the doorbell camera 126 battery 313.

The FIG. 3 example is merely an example, and variations may be made if desired. Some or all of the features may be implemented by the device server 122 or interface 120, instead of at the doorbell controller 301. While the FIG. 3 example shows a video doorbell, the features described herein are applicable to any device having a battery that can benefit from thermal management. Although a heating element 316 is shown and described below, a cooling element may similarly be used to address high temperature extremes.

Figure 4:
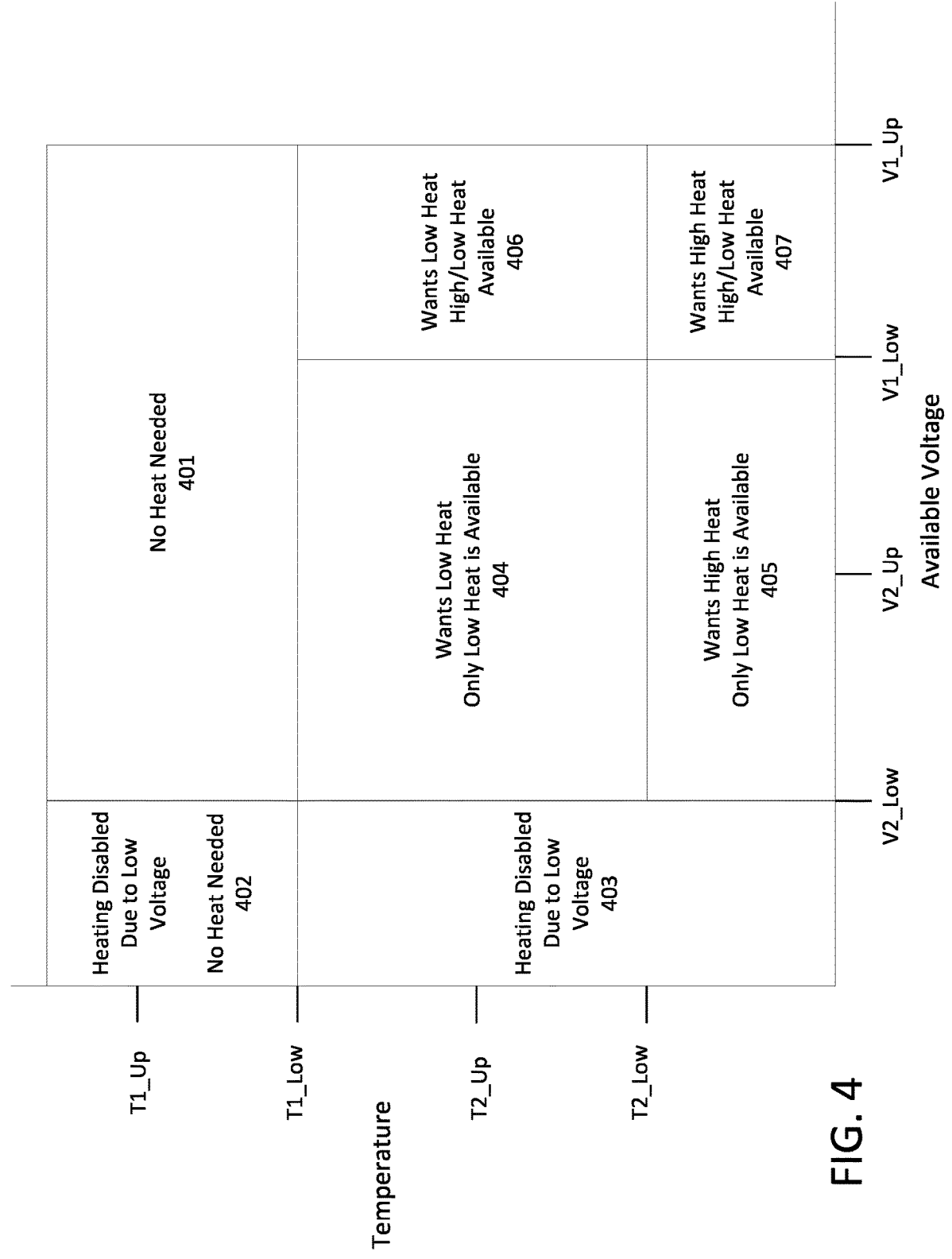
FIG. 4 is a chart showing different heating conditions based on temperature and available battery voltage.

FIG. 4 shows an example of how a two-state heating element 316, offering High and Low states of heating, may be controlled based on temperature and voltage level of the battery 313, and based on one or more thresholds associated with energy needed for a device, such as doorbell 126, to perform various functions. The heating element 316 may consume 2 Watts of energy in a High heat state, and 1 Watt of energy to provide a Low heat state. The heating element 316 may be controlled (e.g., by the doorbell controller 301) to switch between these heating states based on different temperatures and available voltage levels of a power source, such as the battery 313. In the FIG. 4 example, there may be multiple temperature thresholds for controlling the heating element 316. A first temperature threshold, T1_Low (e.g., 10° C.), may generally indicate the temperature above which no heat is needed for the battery 313 to provide sufficient energy for proper operation of the video doorbell 126. A lower threshold, T2_Low (e.g., −15° C.), may generally indicate a Critical low temperature, below which the battery 313 requires the High degree of heat to warm it up so that it may provide sufficient energy for proper operation of the video doorbell 126. The critical low temperature, while low, should still be above a temperature at which the battery 313 ceases to charge. In between T1_Low and T2_Low, the battery 313 performance may be degraded due to a low temperature, but it is not yet critical (e.g., functionality of the doorbell 126 may risk degradation, but the degradation risk is deemed acceptable), so a lower amount of heat is acceptable. There may also be hysteresis shutoff thresholds T1_Up (e.g., 20° C.) and T2_Up (e.g., 5° C.), which may be used to avoid rapidly alternating control of the heating element 316 should the temperature fluctuate near a threshold for turning heat on or off (e.g., T1_Low, T2_Low).

The control of the heating element 316 may also be based on the current state of charge of the battery 313. A first threshold, V1_Low (e.g., 14V), may indicate a voltage level above which the High heating state is available—e.g., the battery 313 in this condition has plenty of energy to offer whatever heating is needed. A second threshold, V2_Low (e.g., 11V), may indicate a voltage level below which no heating is available—e.g., the battery 313 in this condition may be too weak to offer heating, and may conserve its energy for other doorbell functions. In between the thresholds V1_Low and V2_Low, the battery 313 may be considered as having sufficient energy to provide heat, but only at the Low heating level. There may also be a voltage hysteresis shutoff threshold V2_Up (e.g., 13V), which may be used to avoid rapidly alternating control of the heating element 316 should the voltage fluctuate near a threshold for turning heat on or off (e.g., V1_Low, V2_Low).

The various thresholds discussed above may be established based on desired functionality of the device, such as the video doorbell 126. At different temperatures, the battery 313 may provide different amounts of energy, and lower temperatures may result in the battery 313 providing less energy, such that operation of the video doorbell 126 may begin to suffer. Video quality may become reduced (e.g., video artifacts appear, frames are delayed or stutter, etc.), processing speed may be reduced, audio output volume may be reduced, etc. as the battery 313 gets colder, and the thresholds may be established based on acceptable amounts of performance degradation (e.g., energy required to perform any of the various functions that may be performed by the video doorbell 126, or any other device powered by the battery 313, such as performing image recognition, processing audio and/or video, signaling a chime, etc.) at various temperature and voltage levels. For example, a threshold for acceptable battery operation may be a temperature and/or voltage level below which video processing results in video slower than a minimum frame rate of 24 frames per second). These thresholds may result in dividing the FIG. 4 temperature/voltage chart into a plurality of operational regions 401-407 defined by temperature and available voltage. In each operational region 401-407, the current temperature may dictate the desired amount of heat that would be ideal for maintaining operation of the battery 313 (e.g., whether high, low, or no heat is desired), while the available voltage may dictate the amount of energy that can be afforded for providing heat (e.g., whether there is enough energy for high or low heat). If the doorbell 126 is in one of the operational regions 401, the heating element 316 may be activated to provide the highest amount of heat that is both desired (due to temperature) and available (due to available voltage).

In operational region 401, the temperature may be warm enough such that the operation of the battery 313 is not degraded, so no heat is needed. In this operational region 401, the available voltage is also above the minimum threshold V2_Low, such that heat is available if needed, but the warm temperature means that no heat is needed. No heat is needed in this operational region 401, so the heating element 316 may be deactivated.

In operational region 402, the temperature may still be warm enough such that no heat is needed for the battery 313. This is fortunate, however, because in operational region 402 the available voltage is below the minimum threshold V2_Low, and in this operational region the low available voltage is preserved for other functions of the doorbell camera 126, so heating is unavailable. No heat is needed in this operational region 402, so the heating element 316 may be deactivated.

In operational region 403, the temperature is below the threshold T1_Low, so some heat is desirable for the battery 313. Unfortunately, the available voltage in this region 403 is below the minimum threshold V2_Low, so the available voltage is not available for heat, as it is instead preserved for other operations of the doorbell camera 126. No heat is available in this operation region 403, so despite heat being desired, the heating element 316 may be deactivated.

In operational region 404, the temperature is cold enough to warrant heat (e.g., below T1_Low), but warm enough (e.g., above T2_Low) such that only low heat is desired. Fortunately, in this operational region 404, the available voltage is high enough (e.g., above V2_Low) such that at least low heat is available. The voltage in operational region 404 is below V1_Low, so high heat is not available, but fortunately in this operation region 404 only low heat is desired. Low heat is desired in this operational region 404, and the available voltage is sufficient for providing low heat, so the heating element 316 may be activated to provide low heat.

In operational region 405, the temperature is very cold (e.g., below T2_Low)-cold enough to warrant high heat if it is available. Unfortunately, in this operational region 405, the voltage level is too low (e.g., below V1_Low) to afford using energy for high heat. Fortunately, the voltage is at least enough (e.g., above V2_Low) to be able to provide low heat. So while high heat would be desirable in operational region 405, the heating element 316 may be activated to only provide low heat in view of the low amount of available voltage.

In operational region 406, the temperature is, like operational region 404, cold enough to want some heat (e.g., below T1_Low), but warm enough (e.g., above T2_Low) such that low heat will suffice. The available voltage is high enough (e.g., above V1_Low) to provide either high or low heat. So in operational region 406, the heating element 316 may be activated to provide low heat.

In operational region 407, the temperature is, like operational region 405, cold enough such that high heat is desired. The available voltage is high enough (e.g., above V1_Low) such that there is enough energy to provide high heat. So in operational region 405, the heating element 316 may be activated to provide high heat.

The discussion of the FIG. 4 operational states 401-407 may also incorporate the hysteresis thresholds T1_Up, T2_up, and V2_Up. As noted above, these thresholds may be used for changing a heat setting after heating has begun, and may be used to avoid rapidly switching heat if, for example, temperature hovers around a cutoff threshold. For example, in operational region 404, the heating element 316 may be turned on to a low heat setting because the temperature was below the threshold T1_Low. However, shortly after turning on the heat, the temperature would likely rise above that same threshold T1_Low, and this may happen within just a few seconds of activating the heating element 316. If the heating element 316 were deactivated as soon as the temperature rose above threshold T1_Low, then the heating element 316 may experience rapid activation and deactivation as the temperature slightly fluctuated above and below the threshold T1_Low. To avoid this, after the heating element 316 is activated from the operational region 404, the heating may be allowed to continue even after the temperature rises above threshold T1_Low. The heating element 316 may remain activated until the temperature rises above an even higher threshold, T1_Up, before being deactivated. It may take some time before the temperature falls from T1_Up to T1_Low, and this time may help to minimize rapid activation/deactivation of the heating element 316. Similar thresholds may be used for switching between high and low heating states (e.g., high heat activated if temperature falls below T2_Low, but remains high until temperature rises above T2_Up). There may also be a hysteresis threshold (V2_Up) for voltage. For example, instead of turning on low heat if voltage exceeds V2_Low, the low heat may be turned on if voltage exceeds V2_Up, and may stay on even as voltage falls below V2_Up, and might be turned off if the voltage falls below a lower threshold V2_Low. Also, or alternatively, the heating element 316 may transition from low heat to high if the voltage is above V1_Low, and may stay high even if voltage falls below V1_Low, and may turn low if voltage falls below V2_Up.

Figure 5:
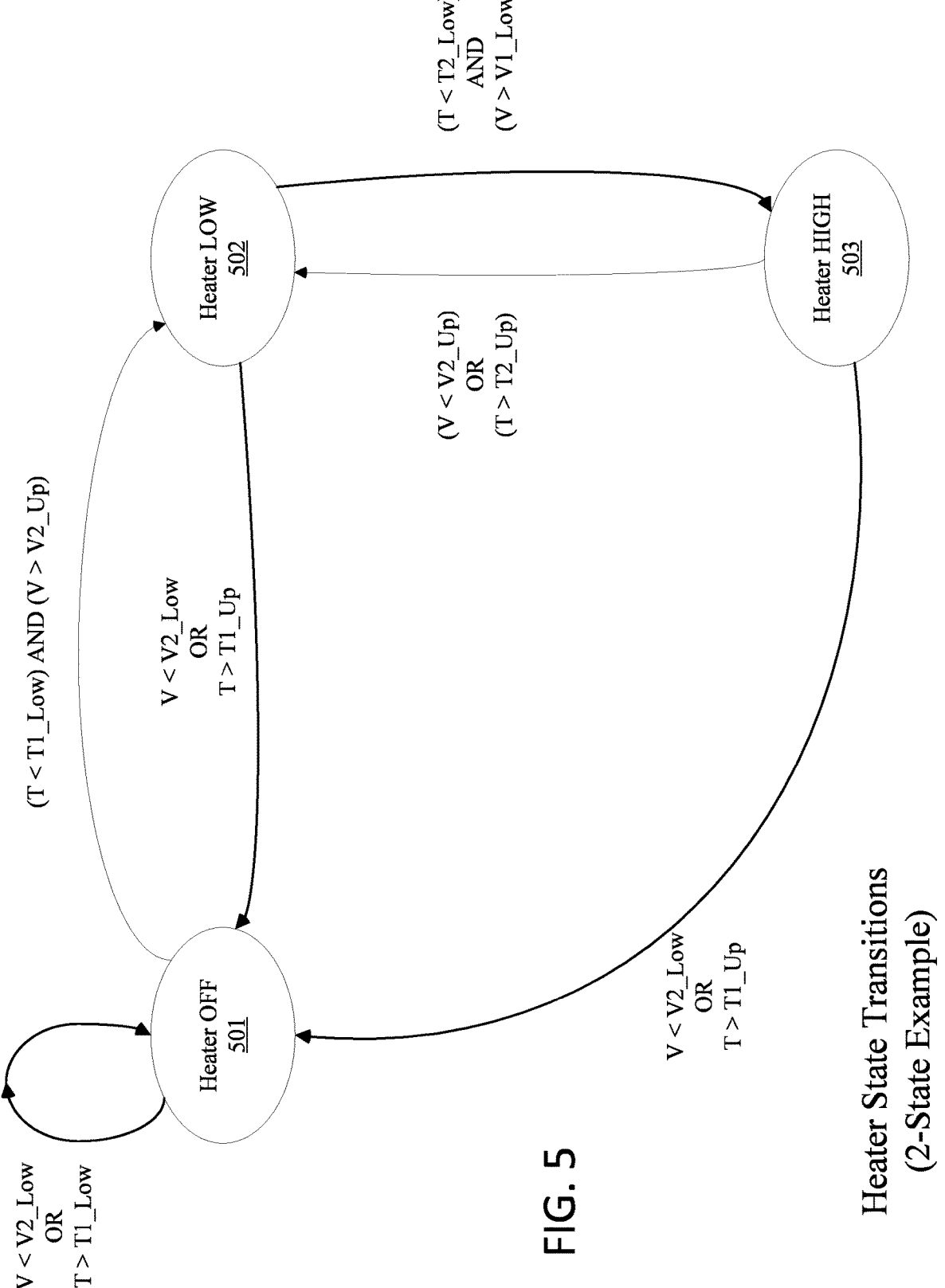
FIG. 5 is a state transition diagram showing different heating states of an example two-level heater, and conditions for transitioning between states.

FIG. 5 shows an example of how satisfying these thresholds may result in changing states of the heating element 316. FIG. 5 shows a state transition diagram, indicating how the heating element 316 may be switched between an OFF heating state 501, a LOW heating state 502, and a HIGH heating state 503, using the thresholds from FIG. 4 and the current voltage level (V) and temperature (T) of the battery 313. Although the discussion below refers to the heating element 316 transitioning between states, such transitioning may be the result of power to the heating element 316 being provided, cut off, increased, or decreased by the controller and/or by the controller controlling one or more switches via which power is provided to the heating element 316.

From the OFF state 501, the heating element 316 may remain in this state as long as the voltage level is below the V2_Low threshold or if the temperature is above T1_Low. As noted above, if the voltage level is below V2_Low, then the battery 313 may conserve its energy for performing doorbell functions; and if the temperature is above T1_Low, then no heat is needed.

From the OFF state 501, the heating element 316 may transition to the LOW heat state 502 in several conditions. The transition may occur if the temperature is cold enough to warrant at least some heat (e.g., T<T1_Low) and the battery 313 has at least enough energy for Low heat (e.g., V>V2_Up).

From the LOW heat state 502, the heating element 316 may transition back to the OFF state 501 in several conditions. It may make this transition if the voltage falls below V2_Low, indicating that the battery 313 energy level is too low to support heating. It may also make this transition if the temperature exceeds T1_Up (indicating that the temperature has warmed up sufficiently). Note that for hysteresis purposes, the T1_Up threshold (for turning off the heat in this transition) is shown to be different from the T1_Low threshold (for turning on the heat from the OFF state 501). The temperature of the battery 313 may be expected to vary slightly (e.g., due to wind, sunlight, etc.), and the difference between T1_Up and T1_Low allows the heating element 316 to avoid rapidly switching on and off if the temperature happens to oscillate around the T1_Low threshold.

From the LOW heat state 502, the heating element 316 may transition to the HIGH heat state 503 if the temperature falls below T2_Low (indicating that HIGH heat is now needed) and if the voltage is greater than V1_Low (indicating that there is sufficient energy in the battery 313 to support the HIGH heat state 503). This may occur, for example, if the LOW heat state 502 is insufficient for warming the battery 313 in view of the ambient temperature.

From the HIGH heat state 503, the heating element 316 may transition to the OFF state 501 if the battery 313 energy drops too low to support heat (e.g., V<V2_Low), or if the temperature exceeds the hysteresis threshold for turning off heat (e.g., T>T1_Up).

From the HIGH heat state 503, the heating element 316 may transition to the LOW heat state 502 in several conditions. It may make this transition if the temperature has risen above T2_Up (a hysteresis threshold for switching between the HIGH heat state 503 and LOW heat state 502; this indicates that the battery 313 still would benefit from heat but is not cold enough to warrant HIGH heat), or if the battery 313 voltage has fallen below a voltage hysteresis threshold (e.g., V2_Up).

The FIG. 5 state transitions are just examples. Variations may be implemented, if desired, to alter (e.g., increase or decrease) the thresholds, to add and/or remove thresholds, and to include more or fewer heating states). In the FIG. 5 state transitions, the heating element 316 may transition to a different state if the corresponding conditions are met, and may stay in its current state if no transition condition is met. However, the indicated state may be affected by other factors as well. These will be discussed with regard to FIGS. 6A-B below.

Figure 6A:
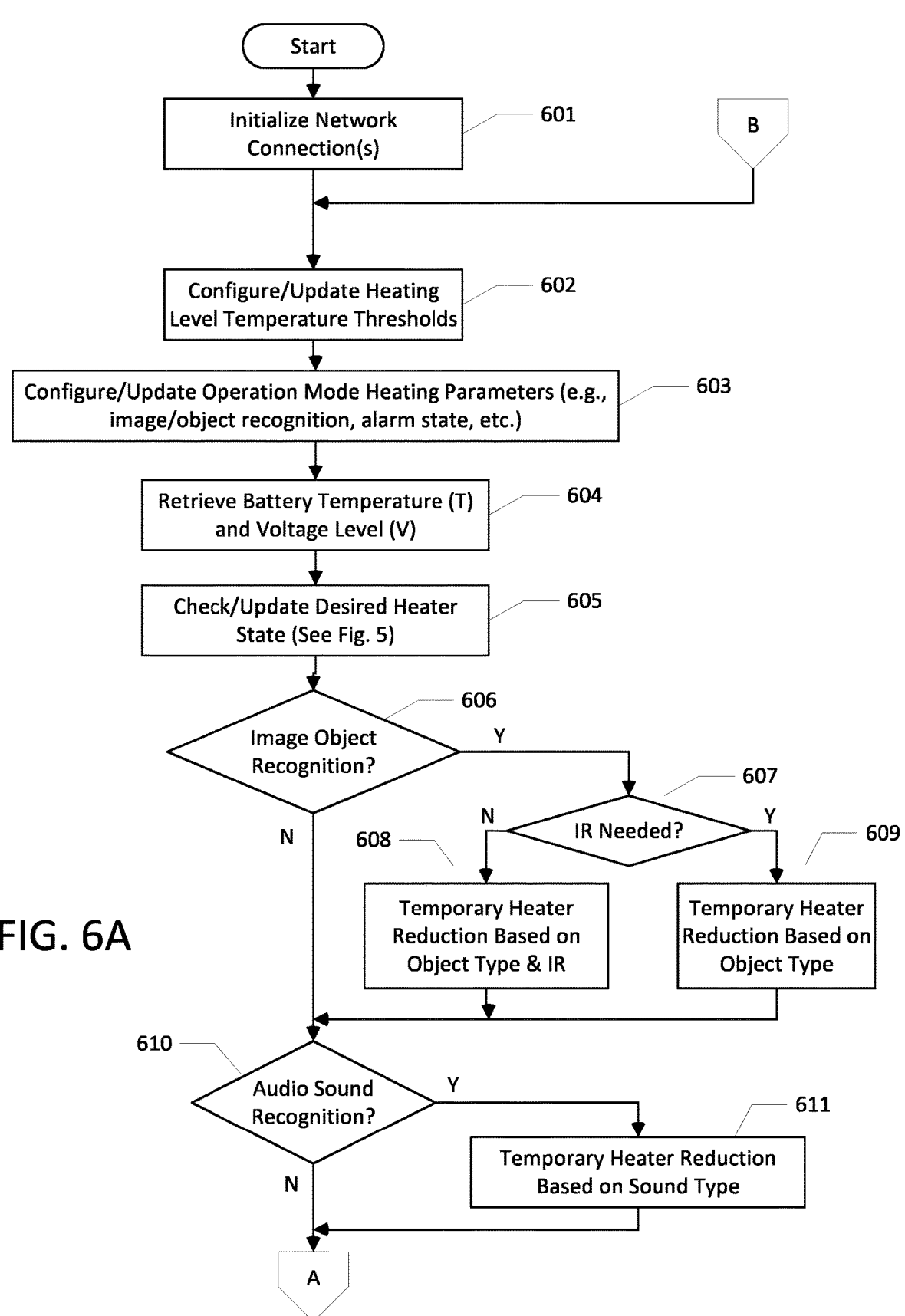
FIGS. 6A-B are a flow chart showing an example method for controlling a heater in a device.
Figure 6B:
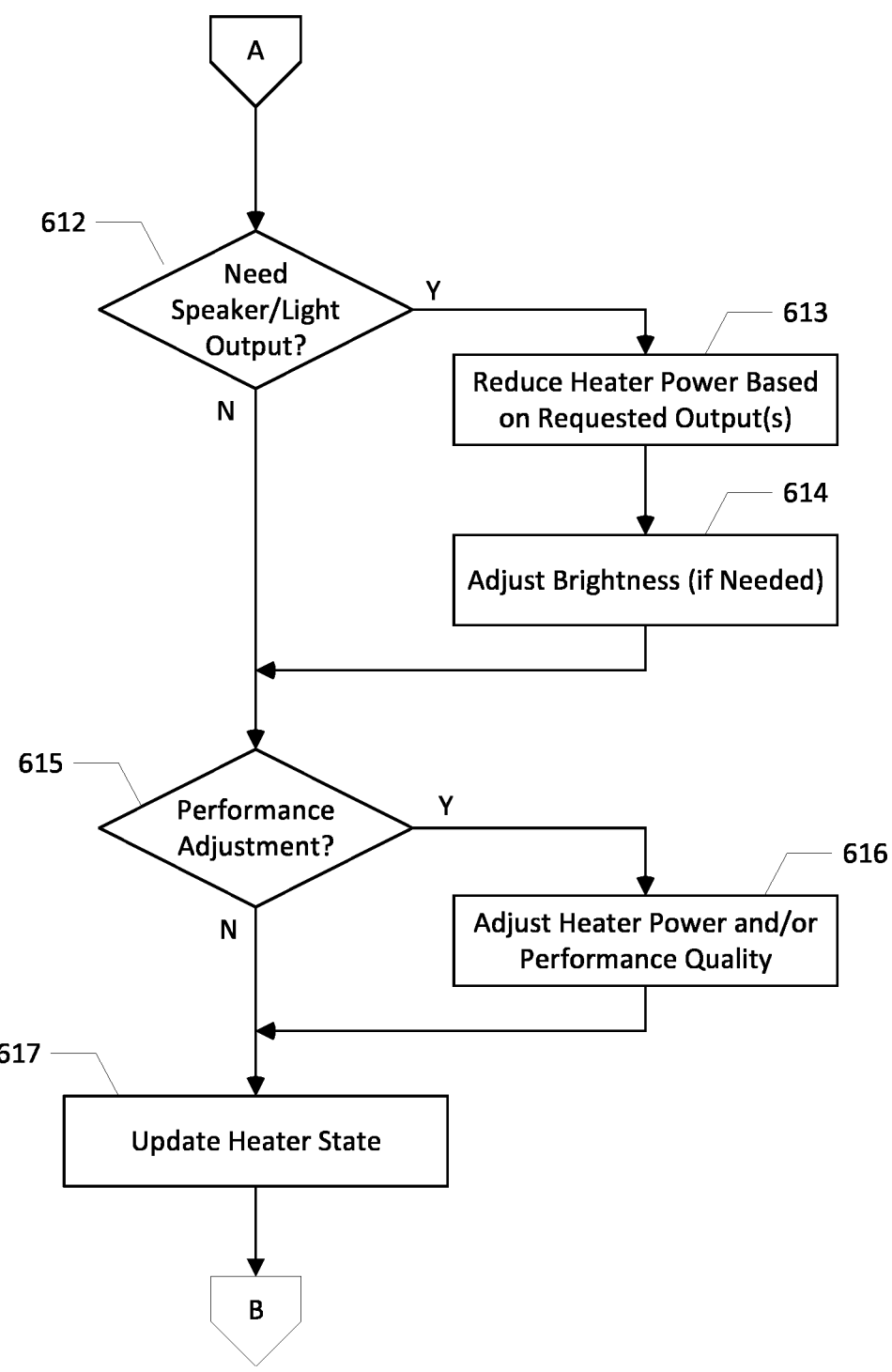

FIGS. 6A-B show an example algorithm for controlling the heating element 316 in accordance with the discussion of FIGS. 4 and 5. The algorithm may be performed by any device that controls (directly or indirectly) the heating element 316. For example, the algorithm may be performed by the doorbell controller 301, the device server 122, the interface 120, the gateway 111, a personal computer 114, or any other desired device or combination of devices. One or more steps of the example algorithm of FIGS. 6A-B may be rearranged (e.g., performed in a different order), omitted, and/or otherwise modified, and/or other steps added.

In step 601, various network connections may be initialized for communication. This may include, for example, establishing the network connection 304 to allow the doorbell controller 301 to communicate with device server 122, or any other device described herein, for sending the various communications described herein (e.g., sending alerts of a press of the button 306, sending a captured video from an image sensor 303, receiving control commands, etc.).

In step 602, various heating thresholds may be established. For example, the thresholds shown in FIG. 4 may be established based on the type of battery 313 used in the doorbell camera 126. Different battery chemistries may have different desired temperature and voltage operating ranges, and the thresholds may be set based on those ranges. The thresholds may also be updated during use, based on historical information. For example, if the ambient temperature in the environment is expected to be warm (e.g., the doorbell controller 301 may access a weather forecast and determine that the forecast calls for the ambient outside temperature to rise significantly), then the triggering thresholds (e.g., T1_Low, T2_Low) may be set lower to reduce the likelihood of use. This may help to conserve the battery 313's available energy, in the expectation that the ambient temperature will be warming the battery soon. As another example, if the heating element 316 is used more than a threshold amount of time, then the doorbell controller 301 may lower the thresholds to allow the battery 313 to tolerate lower operating temperatures. A user may configure the thresholds lower if the user finds that the battery 313 is draining its energy too quickly, and wishes to try and minimize the use of the heating element 316. If the battery 313 is rechargeable by a solar panel, the doorbell controller 301 may use a weather forecast to adjust the heating thresholds. For example, if the forecast calls for sunshine, then the doorbell controller 301 may raise the triggering temperature thresholds (e.g., T1_Low, T2_Low) to be more generous with heating, since the battery 313 is expected to be gaining energy from the sunny conditions.

The thresholds may also be adjusted based on expected use of the doorbell 126. For example, if the premises 102*a* is expected to receive a lot of visitors (e.g., calendar indicates Halloween, or scheduled visitors exceeding a threshold), or if the time of day is a busy time of day (e.g., mail is typically delivered at 2 pm), then the thresholds may be adjusted to account for the increased need for battery 313 energy. V1_Low may be increased, for example, to minimize use of the HIGH heat state 503.

In step 603, additional heating parameters may be configured (or updated) by, for example, a user's manual configuration, a data download from server 122, software update, etc. . . . These additional parameters may alter (or override) the heating states called for by the temperatures and state transitions in FIGS. 4 and 5. For example, the parameters may call for temporary stoppage (or reduction) of heating in order to temporarily divert more battery 313 energy to supporting other functions of the doorbell camera 126. A facial recognition parameter may indicate that if the doorbell camera 126 needs to engage its image processing 311 in order to process a video from the image sensor 303 in order to look for a recognizable face in the video (e.g., to recognize a family member coming home), then the heating element 316 should be temporarily set to the OFF state so that the battery 313 may provide its energy to support that facial recognition process. An automotive vehicle parameter may indicate that if a video is found to have a car in it, then the heating element 316 may be temporarily set to the OFF state to allow the image processing 311 to try and determine whether a license plate is recognizable in the image from the image sensor 303. Different functions, such as the facial recognition or license plate recognition, may require different amounts of energy, and the heating parameters may be set to trigger a heating reduction based on that expected energy amount. The memory 302 may store information indicating different energy amounts for different types of objects (e.g., cars, faces). For example, if the normal operation of the doorbell camera 126 requires 3.2 volts available from the battery 313, and a facial recognition process 311 requires a small amount of additional energy, then the facial recognition parameter may indicate a cutoff threshold of 3.5 volts—slightly higher than normal—helping to ensure the battery 313 has sufficient energy to avoid interfering with the facial recognition if the heating is performed. While the example above uses voltage, the threshold may be managed in terms of power (Wattage) or current (Amperes). For example, 0.25 to 0.3 W can be allocated for facial recognition or object recognition, while there may be an 0.25 W increase when a data rate is increased from 400 Kbps to 1 Mbps, and these energy levels may be taken into account when setting the various thresholds described herein. There may also be a time duration associated with the temporary reduction. The facial recognition parameter may indicate that if the battery 313 is below 3.5 volts, then the heating element 316 should be set to the OFF state 501 for a duration of 1 minute (the expected duration of the facial recognition process). Alternatively, the temporary reduction may be enforced until the facial recognition process is completed (e.g., until the image processing 311 signals completion, or the doorbell controller 301 determines the processing is complete).

There may be many types of additional heating parameters. Some parameters may indicate that the state of a security alarm should affect the heating. For example, if there is an active security alarm event, such that the doorbell camera 126 may be needed to sound an alarm (e.g., via speakers 310) and capture video (via image sensor 303) and communicate with a security system, then a security event parameter may indicate that the heating element 316 should be kept in the OFF state 501 until the security event is cleared. If it is nighttime, and an infrared LED 312 is needed to provide illumination for an infrared image sensor 303 to capture video, then an additional parameter may indicate that the heating element 316 is to be kept in the OFF state 501 while the infrared video is being captured.

Different kinds of objects may have different types of additional parameters. If facial recognition determines that a visitor is unrecognized, then the parameters may call for the heating element 316 to be kept in the OFF state 501, in case the stranger triggers a further security event and additional energy is needed. Alternatively, if facial recognition determines that a visitor is a recognized member of the household, then the parameters may choose to not alter the heating element 316 state, or to do so in a lesser degree (e.g., for less time, with a different threshold voltage, etc.). Audio recognition may similarly yield different results for different types of recognized sounds. Recognizing the sound of a human voice, barking dog, or breaking glass may result in temporarily lowering or disabling heating, to preserve available energy for handling a security event, while heating may resume if other non-security sounds are detected (e.g., passing of a car, squawking of birds, etc.).

In step 604, information indicating the current battery 313 temperature (T) and voltage (V) may be received. The temperature may be obtained from the temperature sensor 314, and/or from the ambient temperature sensor 315. The voltage may be reported from the battery 313 itself, or with an intervening voltage measuring circuit.

In step 605, the temperature and voltage values may be applied to the FIG. 5 state transition diagram, and used to determine the next state for the heating element 316. Of course, the next state may simply be the heating element 316's current state, if no transition is needed. After step 605, the additional heating parameters may be checked to determine whether there should be a further alteration of the heating element 316 state.

In step 606, a determination may be made as to whether there has been an object detected in an image captured by the image sensors 303. For example, the doorbell controller 301 (or its image processing 311) may perform pattern matching to look for matches with a library of predefined images, which may be in memory 202. The library may include images of the homeowner, authorized friends and family, automobiles, identifying logos of authorized visitors (e.g., the local cable company's logo), etc., to help differentiate between expected visitors and unexpected ones. The object recognition may also be triggered by simple motion detection—e.g., if the doorbell controller 301 (or image processing 311) compares a current image with a prior one, and determines a difference indicative of motion, or if the image sensor 303 includes an infrared motion detector.

If an object has been detected, then in step 607, a determination may be made as to whether additional lighting (e.g., infrared lighting if it is dark outside) was needed for the captured image. For example, the doorbell controller 301 may have been configured to automatically turn on lights 312 and record video when motion is detected. If such additional lighting was needed, then there is a chance that the additional lighting will continue to be needed for the duration of the current event. For example, if the recognized object is a person approaching the door, or an automobile, then additional images may be expected as the person rings the doorbell, or to capture images of the automobile's license plate.

If additional lighting was needed, then in step 608, the doorbell controller 301 may store information indicating a temporary reduction of heat output of the heating element 316. This information may, for example, indicate that the heating element 316 should be reduced for a duration of 30 seconds. The amount of reduction may be based on the amount of energy that is expected to be needed for further video processing and powering the additional lighting. For example, if running the video processing 311 and additional lighting 312 would draw enough current such that further draw from the heating element 316 would risk degrading the video processing 311, then the heating element 316 may be reduced or turned OFF. The amount of reduction may also be based on the available states of the heating element 316. For example, the heating element 316 may support more than just the HIGH and LOW heating states discussed above. The information indicating the temporary reduction may be further adjusted in view of any other parameters that are in effect from step 603. With such a reduction, object recognition 606 may result in the diverting of power from heating the doorbell 126 to the processing of video. This may allow the video processing 311 to have more energy to provide a higher bitrate, framerate, and/or resolution of video from image sensor 303.

Alternatively, if no additional lighting was needed in step 607, then in step 609, the temporary reduction of the heating element 316 may be based on the additional energy needed for processing video, without any additional energy for additional lighting. The object recognition above may also result in a temporary increase in brightness of the light 312, to help improve image quality.

In step 610, a similar process may begin for audio, and a determination may be made as to whether audio recognition needs to be performed. This may occur, for example, if the doorbell controller 301 (and/or audio processing 311) determines that the microphone 305 has detected audio that matches a predetermined pattern (e.g., sound a voice, certain spoken word, sound of an approaching vehicle or car alarm, etc.), such that additional audio processing is desired or likely (either for the already captured audio, and/or for future audio that is likely to be captured as a continuation of the captured audio, to recognize audio patterns in memory 302). If such sound recognition is needed, then in step 611, information may be stored to indicate a corresponding temporary heating element 315 reduction based on the amount of energy needed for processing audio. The parameters from step 603 may indicate different reductions for different types of sound. For example, processing audio to recognize a family member's known voice may require more energy/processing than simply recognizing the sound of an approaching vehicle. The parameters from step 603 may indicate different reduction amounts (and/or durations) based on the type of sound that was detected and is expected to be processed.

In step 612, a determination may be made as to whether lighting and/or audio output is desired. For example, if motion has been detected and a high-wattage spotlight light source 312 is needed to illuminate the area (e.g., to scare away a potential burglar), then the doorbell controller 301 may wish to avoid interfering with that, and as a result may decide to refrain from (or reduce level of) running the heating element 316. The doorbell controller 301 may reduce the heating level based on the fact that additional lighting is needed, and the reduction amount may also be based on the type of additional lighting that is needed. A bright spotlight, which may be intended to deter burglars, may require more energy than an infrared light that is merely used to illuminate the area for night video captured by an infrared image sensor 303. These different types of lighting devices may draw different amounts of electrical current, and the doorbell controller 301 may use different amounts of heating reduction accordingly. This is not limited to lighting elements 312, and can extend to any additional energy that is needed to be consumed by the doorbell controller 301 and/or its peripherals. For example, if an intercom feature has been activated, such that the speaker 310 and microphone 305 may be needed to conduct a live voice communication session between the visitor and the homeowner via an Internet connection, then there may be different amounts of heating reduction to account for the use of the speaker 310 and the microphone 305. Chime activation may result in temporarily reducing the heating, to allow the battery 313 energy to be used for sounding the chime via speaker 310. Similarly, in addition to reducing the amount of heat (e.g., instead of ensuring a minimum voltage of 3.2 volts, the doorbell controller 301 may temporary seek to ensure a minimum voltage of 3.8 volts), the reduction can also set a duration of heat reduction (e.g., reducing heat for 1 minute, or until a communication session ends, etc.), as described above.

If such additional lighting and/or audio output (or other) devices are needed, then in step 613, information may be stored to indicate a corresponding temporary reduction in the heating element 316, to divert energy from heating to the output device(s). The information may indicate a degree of reduction as well as a duration for the reduction. The information may be cumulative with the other reductions discussed above. For example, if there is a reduction in step

609 for object recognition and also in step 611 for audio recognition, then the information indicating those reductions may be cumulative. If one called for a 0.5-Watt reduction for 30 seconds, and the other called for a 0.5-Watt reduction for 1 minute, then the cumulative amount may call for a 1-Watt reduction for the next 30 seconds, and then a 0.5 increase for the subsequent 30 seconds (since now only a 0.5-Watt reduction is needed), before returning to the original heating state from step 607.

In step 614, the brightness of the lights 312 may be adjusted if needed. For example, if the battery 313 voltage is below a lighting threshold level, then the doorbell controller 301 may adjust the lighting to a lower level, to preserve the battery 313 energy. A similar kind of reduction may be applied for any other functionality of the doorbell 126. Audio recording quality of audio from microphone 305, video recording quality of video from image sensor 303, audio output volume from speakers 310, etc. may be reduced if the battery 313 energy is below a corresponding threshold.

In step 615, a determination may be made as to whether any performance by the doorbell 126 has suffered, or a performance-based change is needed. For example, if video quality provided by image sensor 303 and/or image processing 311 degrades (e.g., dropping frames, stuttering, losing resolution, etc.), or an error message is received (e.g., via network 304 from any device that receives video and/or audio from the doorbell 126), then the doorbell controller 301 may store information indicating a temporary reduction 616 in the amount of heating offered by the heating element 316. By doing so, the energy draw from the battery 313 may be reduced, to hopefully resolve any quality issues that resulted from insufficient power from the battery 313. Similarly, if heating was temporarily reduced from a prior error, then the step 615 inquiry may determine whether the error has been resolved (e.g., receiving an affirmative message indicating quality has restored, or a threshold amount of time has passed since the error-based reduction occurred), and step 616 may entail removing the heating reduction. The determination may be based on a request for increased performance. For example, the doorbell controller 301 may receive, via network connection 304, a message indicating that a video resolution from image sensor 303 is to be increased. To accommodate the higher processing needed to provide that higher resolution, the heating of the battery 313 may be reduced (if the battery 313 level is below a corresponding threshold).

As another example, if the user begins use of the speaker 310 to speak to a visitor, then the doorbell controller 301 may temporarily halt (or reduce) heating to help ensure the battery 313 energy is available for driving the speaker 310. The adjustment may be based on a volume level of the output of the speaker 310—if the volume is set to be loud, then more energy will be needed, so the heating may be reduced more than if the volume is lower. If the doorbell chime is sounded through the speaker 310, then the heating may be temporarily halted, but if the doorbell chime only uses the house chime 307 (which draws power from the house, and not the battery 313), then the heating may be unaffected.

The performance adjustment may be based on anticipated use, such as that discussed above with respect to updating the thresholds. For example, if a visitor is expected and the battery 313 level is below a threshold, then the doorbell controller 301 may temporarily halt heating. The adjustment may also affect other elements of the doorbell 126, such as video quality (e.g., framerate, resolution) of the image sensor 303, and/or audio quality of the speakers 310 (e.g., sound sample range). A weather forecast may be retrieved by the doorbell controller 301 via network connection 304 (e.g., from an application server 107 that provides weather forecast data), and may be used to precondition the battery 313 temperature in anticipation of changes in the weather. Heating may be halted and/or reduced if the weather is expected to get warm within a threshold quantity of time, or increased if the weather is expected to get cold within a threshold quantity of time.

In step 617, the state of the heating element 316 may be adjusted. This adjustment may take into account the desired state information from the state transition in step 605, as well as any temporary reductions that were indicated in the information stored in previous steps. The step 617 adjustment may consolidate the various adjustments that resulted from those previous steps.

After step 617, the process may return to step 602, and the process may repeat. The repeating process may dynamically adjust heating of the battery 313 based on current temperature and voltage, to help optimize battery 313 life.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. For example, the doorbell 126 may be an outdoor doorbell, but that is just an example, and the same features may be used for managing temperature of any battery-powered device. Security devices such as cameras and sensors may have the same temperature management features discussed above.

The various thresholds described above may be used in alternative ways, to trigger at different temperature and/or power levels. For example, assuming the voltages are high enough to provide any desired heat, the thresholds may be used as follows: Above T1_Up, no heat is required. Low heat is not triggered until the temperature drops below T1_Low. Low heat can be triggered and continues until the temperature drops below T2_Up. Below T2_Up higher heat can be triggered. High heat continues until the temperature exceeds T2_Up. The chime may be disabled below T2_Low. This assumes the voltages are within limits. Similarly, assuming all temperatures are correctly within their ranges, high heat can be used when the voltage is above V1_Low. Low heat is triggered when the voltage drops below V2_Up and remains until the voltage drops below V2_Low. Once below V2_Low, Heat is disabled.

As another example, the various descriptions above used the battery 313 as the example power source, and adjusted heating based on the voltage in the battery 313. The same may be done, however, for any other type of power source, such as power 308 and/or AC/DC 309. Reducing energy draw of heating may help ensure available power for other security-related processing.

Accordingly, the foregoing description is by way of example only, and is not limiting.

The invention claimed is:

1. A method comprising:
  receiving information indicating a temperature associated with a rechargeable battery;
  receiving information indicating a voltage level associated with the rechargeable battery;
  adjusting a heating element, associated with the rechargeable battery, between three levels of heating based on the temperature, the voltage level, and a threshold for acceptable battery operation of a video doorbell, wherein the three levels of heating comprise:

an off state;

a high heating state; and a low heating state.

2. The method of claim 1, further comprising:

setting a heating state of the heating element based on image recognition of an image associated with the video doorbell.

3. The method of claim 1, further comprising:

setting the threshold based on energy needed to maintain video processing above a minimum frame rate.

4. The method of claim 1, further comprising:

setting a heating state of the heating element based on a desired video resolution of the video doorbell.

5. The method of claim 1, further comprising:

setting the threshold based on a weather forecast associated with the video doorbell.

6. The method of claim 1, comprising:

setting the heating element to the low heating state based on the temperature falling below a first temperature threshold;

maintaining the heating element in the low heating state after receiving information indicating that a temperature associated with the rechargeable battery is above the first temperature threshold; and setting the heating element to the off state based on information indicating that a temperature associated with the rechargeable battery is above a second temperature threshold.

7. The method of claim 1, comprising:

increasing a heat setting of the heating element based on determining that the rechargeable battery is at a temperature that is below a temperature threshold; and maintaining the increased heat setting after the rechargeable battery has warmed to above the temperature threshold.

8. A method comprising:

receiving, by a computing device, a video image from an image sensor;

performing object recognition to recognize an object in the video image; and adjusting, based on the recognized object in the video image and based on a threshold associated with operation of a battery-powered video doorbell, a battery heating level of the battery-powered video doorbell.

9. The method of claim 8, wherein the adjusting is based on an amount of video processing needed for processing the video image.

10. The method of claim 8, wherein the adjusting is based on a video quality to be provided by the computing device.

11. The method of claim 8, wherein the threshold is based on information indicating different energy amounts for different types of objects.

12. The method of claim 8, wherein the adjusting is further based on a voltage level of a battery associated with the outdoor battery-powered device.

13. The method of claim 8, wherein the adjusting is further based on:

a voltage level of a battery associated with the outdoor battery-powered device; and a temperature of the battery associated with the outdoor battery-powered device.

14. The method of claim 8, further comprising adjusting the battery heating level through a high heating state and a low heating state.

15. A method comprising:

receiving temperature and voltage information associated with a video doorbell battery;

increasing a heating state of a battery heater based on:

a first voltage level of the battery; and a first temperature of the battery falling below a first threshold associated with operation of the video doorbell; and decreasing the heating state of the battery heater based on:

a second voltage level of the battery; and a second temperature of the battery rising above a second threshold associated with operation of the video doorbell, wherein the second threshold is different from the first threshold.

16. The method of claim 15, further comprising changing the heating state of the battery based on image recognition of an image associated with the battery.

17. The method of claim 15, further comprising changing the heating state of the battery based on audio recognition of audio associated with the battery.

18. The method of claim 15, further comprising changing the heating state of the battery based on illumination associated with the video doorbell.

19. The method of claim 15, further comprising changing the heating state of the battery based on a weather forecast associated with the video doorbell.

20. The method of claim 15, further comprising changing, based on a voltage level of the battery, a video quality associated with the video doorbell.

* * * * *